US011069349B2

(12) United States Patent
Dillard et al.

(10) Patent No.: US 11,069,349 B2
(45) Date of Patent: Jul. 20, 2021

(54) PRIVACY-PRESERVING VOICE CONTROL OF DEVICES (71) Applicant: Dillard-Apple, LLC, Crofton, MD (US)

(72) Inventors: Margaret Dillard, Crofton, MD (US); Logan Apple, Winchester, VA (US)

(73) Assignee: DILLARD-APPLE, LLC, Crofton, MD (US)

( * ) Notice: Subject to any disclaimer, the term of this patent is extended or adjusted under 35 U.S.C. 154(b) by 141 days.

(21) Appl. No.: 16/174,266

(22) Filed: Oct. 29, 2018

(65) Prior Publication Data
US 2019/0139548 A1    May 9, 2019

Related U.S. Application Data (60) Provisional application No. 62/583,423, filed on Nov. 8, 2017.

(51) Int. Cl.
G10L 17/26     (2013.01)
G10L 15/22     (2006.01)
G10L 15/30     (2013.01)
G06F 3/16      (2006.01)
G10L 13/00     (2006.01)
H04K 1/02      (2006.01)
G10L 15/26     (2006.01)

(52) U.S. Cl.
CPC ........... G10L 15/22 (2013.01); G06F 3/167 (2013.01); G10L 13/00 (2013.01); G10L 15/26 (2013.01); G10L 15/30 (2013.01); H04K 1/02 (2013.01); G10L 2015/223 (2013.01)

(58) Field of Classification Search
CPC ........... G10L 15/22; G10L 2015/088; G10L 2015/223; G10L 15/26; G10L 15/30; G10L 25/78; G10L 15/063; G10L 15/00; G10L 17/00
See application file for complete search history.

(56) References Cited

U.S. PATENT DOCUMENTS

| 5,911,129 | A | * | 6/1999 | Towell | G10L 13/033 704/223 |
| 7,418,392 | B1 | * | 8/2008 | Mozer | G10L 15/26 315/307 |
| 10,147,441 | B1 | * | 12/2018 | Pogue | H04R 3/005 |
| 10,186,265 | B1 | * | 1/2019 | Lockhart | G10L 15/32 |
| 10,515,653 | B1 | * | 12/2019 | Pogue | H04R 3/005 |
| 2002/0069063 | A1 | * | 6/2002 | Buchner | H04L 12/282 704/270 |

(Continued)

Primary Examiner — Olujimi A Adesanya
(74) Attorney, Agent, or Firm — Siritzky Law, PLLC (57) ABSTRACT The speech command issued to a voice activated/controlled system is anonymized so that biometric voice data of the speaker may not be received by the voice activated/controlled system. A spoken audio command is converted to text, which is then converted to a synthesized voice signal. The synthesized voice signal is then provided to the voice-activated/controlled device. The synthesized voice signal may be provided to the voice-activated device within a sound shield or enclosure so that the original speech command issued by the speaker may not be received by the voice-activated/controlled system. In this way, the speaker's actual voice and related data may be kept private and secure.

21 Claims, 5 Drawing Sheets (56) References Cited

U.S. PATENT DOCUMENTS

| | | | | |
|---|---|---|---|---|
| 2009/0171670 A1* | 7/2009 | Bailey | ............... | G10L 21/06 |
| | | | | 704/278 |
| 2013/0275875 A1* | 10/2013 | Gruber | ............... | H04L 67/12 |
| | | | | 715/728 |
| 2017/0105118 A1* | 4/2017 | Lee | ............... | H04M 1/026 |
| 2018/0321905 A1* | 11/2018 | Fountaine | ............... | G06F 3/165 |
| 2019/0005952 A1* | 1/2019 | Kruse | ............... | G10L 13/00 |

* cited by examiner

PRIVACY-PRESERVING VOICE CONTROL OF DEVICES

RELATED APPLICATIONS

This application is related to and claims priority from U.S. Provisional patent application No. 62/583,423, filed Nov. 8, 2017, the entire contents of which are hereby fully incorporated herein by reference for all purposes.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention relates generally to preserving the privacy of a user's voice, and, more particularly, to anonymizing a user's voice by converting it to a synthesized reproduction for use with a voice-activated/controlled system.

BACKGROUND

Voice activation technology has been incorporated in a wide variety of products and systems ranging from smart home systems such as Google Home and Amazon Echo to Internet-enabled television sets and other VoIP devices. The technology allows such devices to be controlled via voice commands issued by the user in lieu of commands issued via a keyboard or other physical interface. For example, a user may speak to his/her smart home system and instruct it to purchase an item online or to play a particular song. More supplicated systems may allow the user to turn on a home security system, adjust a thermostat's temperature setting, turn on a television to a particular channel, order a pizza from a neighborhood pizzeria, or other commands. The systems may include elements of artificial intelligence that may allow them to interpret the voice commands and perform the requested actions. In addition, many of these systems may be connected to the Internet or to other networks such that they may control other devices that may reside on the same network (e.g., devices that may be configured with Internet of Things (IoT) protocols).

In this way, it can be seen that this voice recognition technology may present a very convenient way for users of such systems to easily command the systems to perform their bidding.

However, this same voice recognition technology may also open up the possibilities for captured voice commands to be used for nefarious purposes. For example, a voice-enabled smart home system connected to the Internet may upload the received voice commands from the user to its cloud services for further processing. Once uploaded, the voice samples may be vulnerable to hackers who may wish to obtain users' unique biometric voice data to be exploited and/or sold in illegal commerce.

For example, once a hacker obtains samples of a particular user's unique biometric voice data, the hacker may construct a speech model of the user's voice (sometimes referred to as a "voice fingerprint"). Once the voice fingerprint may be developed, the hacker may use the voice model to access other systems and services that may be unlocked via the user's voice commands. Examples of such vulnerable systems and services may include the user's smartphone device, the user's home security system, the user's financial services information, or other types of VoIP systems.

Given this, it can be seen that once a hacker may have access to a user's unique biometric voice data, the user's privacy and security may be seriously jeopardized.

Accordingly, there is a need for a system and method that may prevent a voice command issued to a voice-enabled device from being vulnerable to hacking and exploitation. There is also a need to provide the solution as an easy-to-use turnkey system that may work with the majority of voice activated systems on the market.

SUMMARY

The present invention is specified in the claims as well as in the below description. Preferred embodiments are particularly specified in the dependent claims and the description of various embodiments.

One general aspect includes a system for anonymizing a user's voice for a voice-activated/controlled device, where the voice-activated/controlled device has at least one audio input device, the system including: at least one sound shield. The system also includes an audio-to-text converter configured to receive an audio phrase in the user's voice and to provide, as a textual output, an audio-to-text conversion of the audio phrase. The system also includes a text-to-audio converter configured to receive as input the textual output from the audio-to-text converter and to provide an audio output corresponding to said textual output from the audio-to-text converter. The system also includes an audio output device configured within the at least one sound shield to provide said audio output from said text-to-audio converter as audio input to the at least one audio input device of the voice-activated/controlled device, where the at least one sound shield is configured: (i) to allow audio input from the audio output device to be received by the at least one audio input device of the voice-activated/controlled device, and (ii) to block direct audio input the voice-activated/controlled device from a user.

Implementations may include one or more of the following features:

- The system where the audio phrase includes a voice command for the voice-activated/controlled device.
- The system where the textual output includes a synthesized representation of the voice command
- The system where a portion of the voice-activated/controlled device is contained within the at least one sound shield.
- The system where the voice-activated/controlled device is fully contained within the at least one sound shield.
- The system where the at least one sound shield is constructed, adapted, and configured to prevent substantially all sounds, except sound from the audio output device, from reaching the voice-activated/controlled device.
- The system where the at least one sound shield is constructed, adapted, and configured to prevent substantially all sounds, except sound from the audio output device, from reaching the at least one audio input device of the voice-activated/controlled device.
- The system where the voice-activated/controlled device is a network-connected device.
- The system where the network is the Internet.

The system, where at least the audio-to-text converter and the text-to-audio converter operate in real time.

One general aspect includes a method for anonymizing a voice command issued to a voice-activated/controlled device, the method including: (a) converting the voice command to text; and then. The method also includes (b) converting the text to audio; and then. The method also includes (c) outputting the audio using an audio output device within at least one sound shield, where the at least one sound shield is configured: (i) to allow audio input from the audio output device to be received by the voice-activated/controlled device, and (ii) to otherwise block audio input to the voice-activated/controlled device.

Implementations may include one or more of the following features:

The method where the outputting the audio in (c) includes outputting a synthesized representation of the voice command.

The method where a portion of the voice-activated/controlled device is contained within the sound shield.

The method where the voice-activated/controlled device is fully contained within the sound shield.

The method where the audio output device is at least partially contained within the sound shield.

The method where the at least one sound shield is constructed, adapted, and configured to prevent substantially all sounds, except sound from the audio output device, from reaching the voice-activated/controlled device.

The method where the voice-activated/controlled device has at least one audio input device, and where the at least one sound shield is constructed, adapted, and configured to prevent substantially all sounds, except sound from the audio output device, from reaching the at least one audio input device of the voice-activated/controlled device.

The method where the voice-activated/controlled device is a network-connected device.

The method where the network is the Internet.

The method, where at least the converting in (a) and the converting in (b) occur in real time.

A skilled reader will understand that any method described above or below and/or claimed and described as a sequence of steps or acts is not restrictive in the sense of the order of steps or acts.

Below is a list of system or device embodiments. Those will be indicated with a letter "S". Whenever such embodiments are referred to, this will be done by referring to "S" embodiments.

S1. A system for anonymizing a user's voice for a voice-activated/controlled device, wherein the voice-activated/controlled device has at least one audio input device, the system comprising:
at least one sound shield;
an audio-to-text converter configured to receive an audio phrase in the user's voice and to provide, as a textual output, an audio-to-text conversion of the audio phrase;
a text-to-audio converter configured to receive as input the textual output from the audio-to-text converter and to provide an audio output corresponding to said textual output from the audio-to-text converter; and
an audio output device configured within the at least one sound shield to provide said audio output from said text-to-audio converter as audio input to the at least one audio input device of the voice-activated/controlled device,
wherein the at least one sound shield is configured: (i) to allow audio input from the audio output device to be received by the at least one audio input device of the voice-activated/controlled device, and (ii) to block direct audio input the voice-activated/controlled device from a user.

S2. The system of embodiment S1, wherein the audio phrase comprises a voice command for the voice-activated/controlled device.

S3. The system of embodiments S1 or S2, wherein the textual output comprises a synthesized representation of the voice command.

S4. The system of any one of embodiments S1 to S3, wherein a portion of the voice-activated/controlled device is contained within the at least one sound shield.

S5. The system of embodiment S4, wherein the voice-activated/controlled device is fully contained within the at least one sound shield.

S6. The system of any one of embodiments S1 to S5, wherein the at least one sound shield is constructed, adapted, and configured to prevent substantially all sounds, except sound from the audio output device, from reaching the voice-activated/controlled device.

S7. The system of embodiment S6, wherein the at least one sound shield is constructed, adapted, and configured to prevent substantially all sounds, except sound from the audio output device, from reaching the at least one audio input device of the voice-activated/controlled device.

S8. The system of any one of embodiments S1 to S7, wherein the voice-activated/controlled device is a network-connected device.

S9. The system of embodiment S8, wherein the network is the Internet.

S10. The system any one of embodiments S1 to S9, wherein at least the audio-to-text converter and the text-to-audio converter operate in real time.

Below is a list of method or process embodiments. Those will be indicated with a letter "M". Whenever such embodiments are referred to, this will be done by referring to "M" embodiments.

M11. A method for anonymizing a voice command issued to a voice-activated/controlled device, the method comprising:
(A) converting the voice command to text; and then
(B) converting the text to audio; and then
(C) outputting the audio using an audio output device within at least one sound shield,
wherein the at least one sound shield is configured: (i) to allow audio input from the audio output device to be received by the voice-activated/controlled device, and (ii) to otherwise block audio input to the voice-activated/controlled device.

M12. The method of embodiment M11, wherein the outputting the audio in (C) includes outputting a synthesized representation of the voice command.

M13. The method of embodiments M11 or M12, wherein a portion of the voice-activated/controlled device is contained within the sound shield.

M14. The method of any one of embodiments M11 to M13, wherein the voice-activated/controlled device is fully contained within the sound shield.

M15. The method of any one of embodiments M11 to M14, wherein the audio output device is at least partially contained within the sound shield.

M16. The method of any one of embodiments M11 to M15, wherein the at least one sound shield is constructed, adapted, and configured to prevent substantially all sounds, except sound from the audio output device, from reaching the voice-activated/controlled device.

M17. The method of embodiment M16, wherein the voice-activated/controlled device has at least one audio input device, and wherein the at least one sound shield is constructed, adapted, and configured to prevent substantially all sounds, except sound from the audio output device, from reaching the at least one audio input device of the voice-activated/controlled device.

M18. The method of any one of embodiments M11 to M17, wherein the voice-activated/controlled device is a network-connected device.

M19. The method of embodiment M18, wherein the network is the Internet.

M20. The method any one of embodiments M11 to M19, wherein at least the converting in (A) and the converting in (B) occur in real time.

The above features, along with additional details of the invention, are described further in the examples herein, which are intended to further illustrate the invention but are not intended to limit its scope in any way.

BRIEF DESCRIPTION OF THE DRAWINGS

Various objects, features, and characteristics of the present invention as well as the methods of operation and functions of the related elements of structure, and the combination of parts and economies of manufacture, will become more apparent upon consideration of the following description and the appended claims with reference to the accompanying drawings, all of which form a part of this specification.

DETAILED DESCRIPTION OF THE PRESENTLY PREFERRED EXEMPLARY EMBODIMENTS

Figure 1:
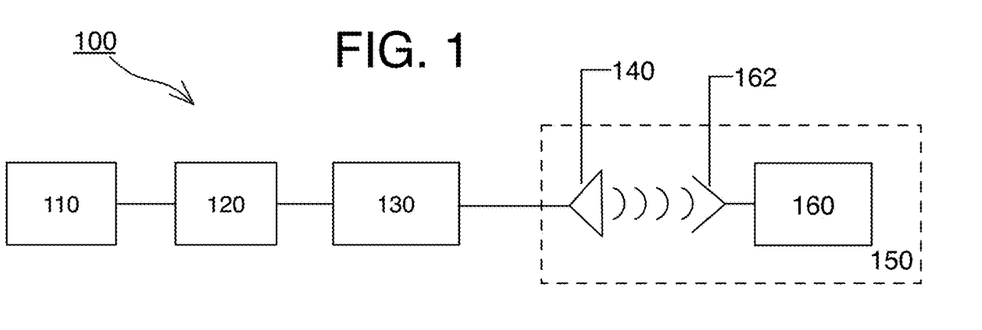
FIG. 1 is a block diagram of a voice privacy system according to exemplary embodiments hereof.

A system or framework 100 according to exemplary embodiments hereof is described with reference to the drawing in FIG. 1. System 100 may generally comprise audio receiver system 110, audio-to-text converter 120, text-to-audio converter 130, audio output device 140, and sound shield 150. As will be described in detail below, system 100 may be used in conjunction with a voice-activated system such as a so-called smart home system 160 that may include an audio input 162. Examples of such smart home systems may include, without limitation, Google Home, Amazon Echo, Internet-enabled "smart" televisions, set-top boxes, and others. Note that the use of system 100 is not limited to smart home systems, and system 100 may be used with any type of voice-activated or voice-controlled system, combination of voice-activated/voice-controlled systems, networks of voice-activated/voice-controlled systems, or other types or combination of types of voice-activated/voice-controlled systems. Thus, while the following description is given primarily with respect to smart home systems, those skilled in the art will realize and understand, upon reading this description, that it is applicable to other types of voice-activated or voice-controlled systems.

A purpose of system 100 may be to provide the user of a smart home system 160 with a system and method of controlling the smart home system 160 using a synthesized reproduction of their voice in lieu of their own native (or actual) voice. The system 100 may operate in real time or in near real time. In this way, the smart home system 160 may be controlled via user-issued voice commands and yet may never receive the user's actual voice or voice biometric data. Those of ordinary skill in the art will realize and appreciate, upon reading this description, that since the system 160 never gets the user's actual voice (or even a variation or modification thereof), the system 160 will not be able to capture, store, upload, process, manipulate, or otherwise have or possess a sample of the user's voice biometric data. Thus, using embodiments hereof, no samples or recordings of the user's native voice (or variations or modifications thereof) may be available to the smart home system 160 to be stored, uploaded, processed, or used in any way.

In general, a user of system 100 may begin by speaking an audio command known to the system. The command may preferably begin with a trigger word or phrase that may initiate system 100 to ready itself to receive and process a complete command. Alternatively, the user may initiate the system 100 using a trigger action such as pressing a control button or the like. The user may follow the trigger word, phrase, or trigger action with a spoken command that may ultimately be intended for the smart home system 160. Once initialized, audio receiver 110 may receive the complete audio command from the user and relay that command to the audio-to-text converter 120. Note also that a trigger command and/or trigger action may not be required and that system 100 may automatically, upon initial boot-up, be actively awaiting a command from the user.

At this point, having received a command from the user, the audio-to-text converter 120 may convert or otherwise translate the received audio message to a corresponding textual representation of the message. This textual representation may be in the form of a textual string. For example, the audio-to-text converter 120 may convert the words in the received audio message to corresponding textual representation(s) of those words. The textual string output by the audio-to-text converter 120 may then be provided to the text-to-audio converter 130 that may, in turn, convert or otherwise translate the textual string to an audio signal. It may be preferable that the audio signal comprise spoken representations of each individual word within the textual string such that the resulting audio signal simulates or otherwise represents the original spoken command issued by the user.

It may be preferable that the output spoken audio signal from the text-to-audio converter 130 be represented by a synthesized voice that may be clear and articulate and at a tempo, volume and pitch that may be easily understood. This audio output from the text-to-audio converter 130 may then be provided to the audio output device 140 that may be a speaker or other type of sound wave generator or audio output device. Audio output device 140 may then output the spoken audio signal into the environment such that the audio signal transmits via audible sound waves. The output of the text-to-audio converter 130 may be optimized or tuned for the smart home system 160.

As should be appreciated, the output of the text-to-audio converter 130 is synthetic and bears no relationship to the user's actual or native voice, and there is no way to determine any features of the user's actual or native voice based on analysis of the output of the text-to-audio converter 130.

As should be appreciated, however, that the user's voice must not reach the audio input 162 of the system 160, at least not when giving commands. In other words, there should be no way for the system 160 to associate a particular user's voice with any commands produced as output of the text-to-audio converter 130.

In this regard, the audio output device (e.g., speaker) 140 and the audio input 162 of smart home system 160 may both be generally enclosed within a sound shield 150. In this way, the audio input 162 of smart home system 160 may receive the output audio signal from audio output device 140 and thereby process the command accordingly to its operating parameters. The sound shield 150 preferably dampens or otherwise blocks the original spoken command spoken by the user so that the original spoken command may not be received by the audio input 162 of the smart home system 160. In this way, the smart home system 160 preferably only receives and processes the synthesized voice command output by audio output device 140, thus providing voice anonymity and privacy to the user. In effect, system 100 may anonymize the user's voice thereby rendering it unusable for creating a voice or speech model.

Figure 2:
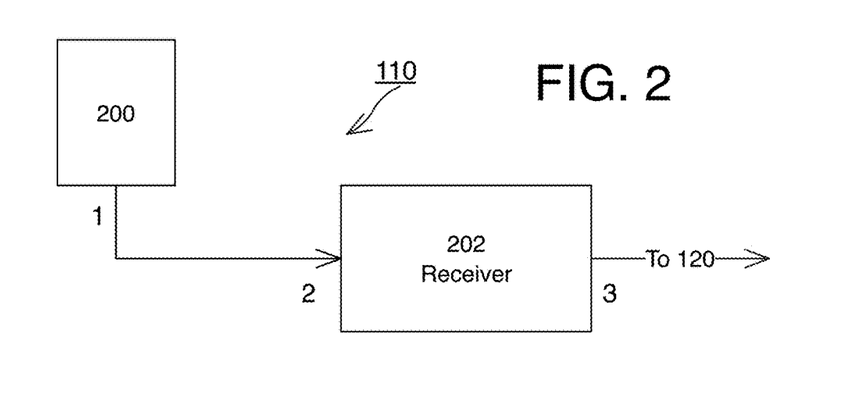
FIG. 2 is a block diagram of an audio receiver according to exemplary embodiments hereof.

Each system, device, and component of system 100 will now be described in further detail. As depicted in FIG. 2, audio receiver system 110 may include an instrument (e.g. a transducer) for converting sound waves into electrical energy variations (i.e. electrical signals) which may then be amplified, transmitted, recorded, or otherwise affected and/or used. In one embodiment, this instrument may include microphone 200 that may be configured to receive the spoken command uttered by the user. Microphone 200 may include a dynamic microphone, a condenser microphone, a piezoelectric microphone, or other types of microphones known in the art. In this way, microphone 200 may receive the audio command (i.e. sound wave) spoken by the user and convert it into a corresponding electrical signal that may then be output at its port 1. Note that microphone 200 may include other components such as a pre-amplifier to boost the output electrical signal, an impedance matching network that may match the output impedance of microphone 200 to the input impedance of the receiving device of the output electrical signal, and other electrical and/or non-electrical components.

Audio receiving system 110 may also include receiver 202 that may receive at its input port 2 the output electrical signal from microphone 200. Receiver 202 may include amplifiers, filters, tuners, equalizers, mixers, and other components that may be used to boost, modify, clean or generally affect the input electrical signal so that it may be processed or otherwise utilized. At this point, receiver 202 may output the electrical signal at its port 3 to the input port 4 (FIG. 3) of the audio-to-text converter 120.

Figure 3:
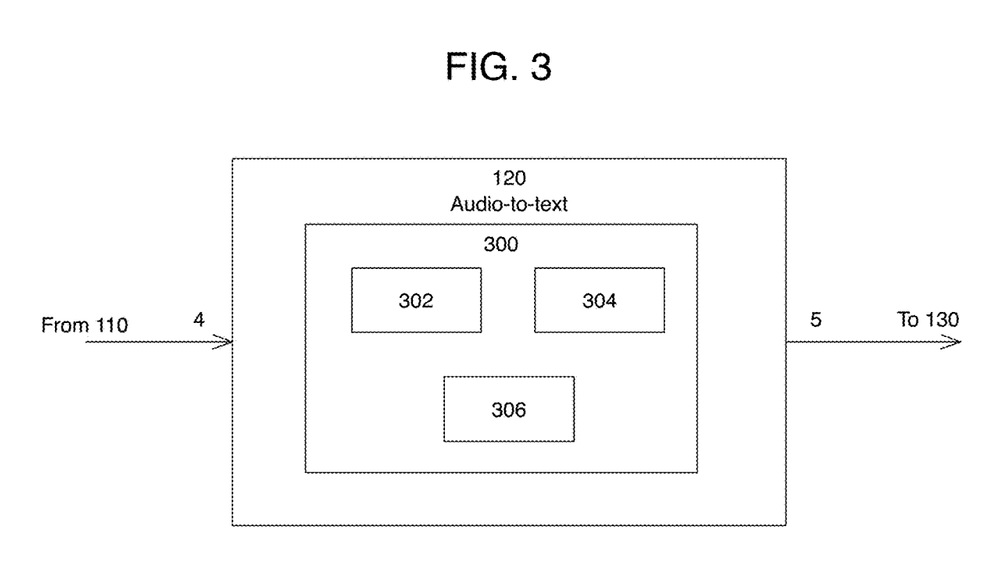
FIG. 3 is a block diagram of an audio-to-text converter according to exemplary embodiments hereof.

With reference now to FIG. 3, the audio-to-text converter 120 may include one or more processors 300 (herein referred to as processor 300) that may include all of the associated electrical and non-electrical components, devices and/or systems that may be required for each processor 300 to properly function and perform its defined operations. These may include power supplies, circuit boards, capacitors, inductors, resistors, amplifiers and other components, devices and systems that may be required as known in the art. In addition, it should be understood that processor 300 may include microprocessors, CPUs, computers, controllers or any other type or combination of types of devices that may perform the operations as defined in this description. Note also that processor 300 may be a unique processor 300 or set of processors 300 utilized only by audio-to-text converter 120, or may be a shared processor 300 or shared set of processors 300 that may also be utilized by others components or systems within system 100 such as the text-to-audio converter 130 as described in sections below.

Processor 300 may also include a variety of software programs, applications, or scripts that may run on processor 300. For example, processor 300 may include voice activation software 302 (represented by a block within processor 300 in FIG. 3) that may be configured or otherwise programmed to recognize particular trigger words or phrases, that when recognized, may trigger processor 300 to initiate and generally run other software such as audio-to-text conversion software 304 (also residing within processor 300 and represented as block 304 in FIG. 3). In one example, a trigger phrase may be "Hello Free Speak," such that when the user speaks this phrase, the sound waves representing this audio command may be received by microphone 200, transmitted to receiver 202 by microphone 200, transmitted to processor 300 by receiver 202, and recognized by voice activation software 302. At this point, voice activation software 302 may trigger processor 300 to initiate and run audio-to-text conversion software 304 and to await further voice commands.

In addition, processor 300 may include memory 306 that may be random access memory (RAM), read-only memory (ROM), hard drives, optical drives, CDs, DVDs, SD cards, USB memory sticks, or other types of memory. Memory 306 may store said software and said received electrical signals, as well as other information, data or other types of electronic media that may be utilized by audio-to-text converter 120. It should also be noted that audio-to-text converter 120 may also include memory that may be instead of or in addition to memory 306 of processor 300.

The user may next issue the intended speech command. The speech command may be received by receiver system 110 and relayed to the audio-to-text converter 120. Audio-to-text converter 120 may convert the speech command to a textual representation of each word spoken. The resulting text string may also be an electrical signal that may represent a verbatim textual transcript of the commands spoken by the user. Note that it may be preferable that the trigger word or phrase as described above not be included in the conversion.

As known in the art, the audio-to-text converter 120 may implement a variety of different models for the audio conversion.

In addition, a language model may capture the regularities in the spoken language to be used by a speech recognizer to estimate the probability of word sequences. In one example, and n-gram model may be employed to capture the syntactic and semantic constraints of the language by estimating the frequencies of sequences of n words.

Note that these models are described for demonstration purposes and that other models or combinations of models may be used by audio-to-text converter 120.

It should be noted that when the user has finished speaking their intended command, they may pause to create a moment of silence that may signify that the end of the command has been reached and spoken, and that the user would like the command to be processed. This moment of silence may be recognized by the audio-to-text converter 120 as such and the audio-to-text converter software 304 may cease converting any further signals until another trigger word or phrase may be received. Note that the moment of silence may be one second, two seconds, three seconds, or other amounts of time, and may be recognized by voice activation software 302, audio-to-text converter software 304, or by other software or other means. Alternatively, the user may speak a predetermined "closing" command word or phrase that may be interpreted by the audio-to-text converter 120 as a signal that the end of the command has been reached. For example, the closing command may be "end of command" or "stop." In addition, the user may end the command by performing a control action such as pressing a button on system 100.

Once the end of the spoken command has been signified and the audio-to-text converter has converted the received signal to textual format, it may output this new electrical signal at its output port 5 to the text-to-audio converter 130.

If there is a problem with recognizing the spoken commands from the user, the audio-to-text converter 120 may flag the user to notify him/her that the intended command needs to be repeated. The flag may be in the form of an illumination (such as a red warning light on system 100), a spoken message that may state that the command was not understood and that may ask the user to repeat it, or some other type of flag, warning message, or signifier. At this point, the user may or may not be required to repeat the trigger word or phrase, and may repeat the intended command until it has been successfully understood. In addition, system 100 may include a reset button or other controls that the user may employ during its operation.

After the intended spoken command has been received and successfully converted to a textual representation of the command words, the resulting electrical signal may be output by the audio-to-text converter 120 at port 5 and into the input port 6 (FIG. 4) of the text-to-audio converter 130.

Figure 4:
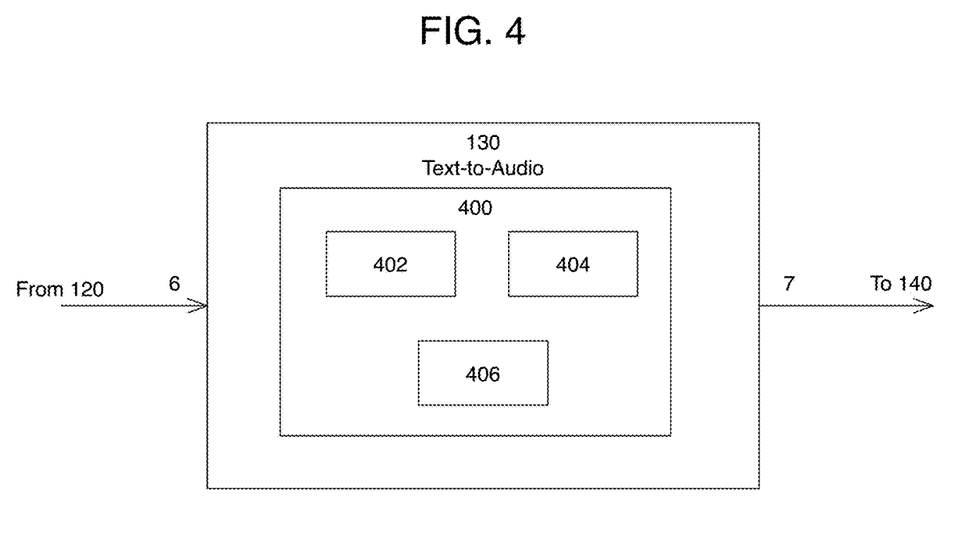
FIG. 4 is a block diagram of a text-to-audio converter according to exemplary embodiments hereof.

As depicted in FIG. 4, text-to-audio converter 130 may include one or more processors 400 (herein referred to as processor 400) that may include all of the associated electrical and non-electrical components, devices and/or systems that may be required for each processor 400 to properly function and perform its defined operations. These may include power supplies, circuit boards, capacitors, inductors, resistors, amplifiers and other components, devices and systems that may be required as known in the art. In addition, it should be understood that processor 400 may include microprocessors, CPUs, computers, controllers or any other type or combination of types of devices that may perform the operations as defined in this description. Note also that processor 400 may be a unique processor 400 or set of processors 400 utilized only by text-to-audio converter 130, or may be a shared processor 400 or set of processors 400 that may also be utilized by others components or systems within system 100 such as the audio-to-text converter 120 as described in sections above.

Processor 400 may also include various software programs, applications, or scripts that may run on processor 400. For example, processor 400 may include text-to-audio conversion software 402 (represented in the drawing by a block 402 within processor 400 in FIG. 4), and speech synthesis software 404 (represented in the drawing by a block 404 within processor 400 in FIG. 4).

Processor 400 may include memory 406 that may be random access memory (RAM), read-only memory (ROM), hard drives, optical drives, CDs, DVDs, SD cards, USB memory sticks, or other types of memory. Memory 406 may store said software and said received signals, as well as other information, data or other types of electronic media that may be utilized by text-to-audio converter 130. It should also be noted that text-to-audio converter 130 may also include memory that may be instead of or in addition to memory 406 of processor 400.

Once text-to-audio converter 130 receives the above-described text (e.g., textual string) from audio-to-text converter 120, text-to-audio converter software 402 may convert the text to a new audio signal. In one example, text-to-audio software 402 may first convert or otherwise translate the text string into the equivalent of written-out words (a process often referred to in the art as text normalization, pre-processing, or tokenization). Software 402 may then assign phonetic transcriptions to each word, and divide and mark the text into prosodic units like phrases, clauses, and sentences (a process often referred to in the art as text-to-phoneme or grapheme-to-phoneme conversion).

After this has been accomplished, the resulting phonetic transcriptions and prosody information together may be provided to speech synthesis software 404 that may convert the symbolic linguistic representations into electronic sound files that may comprise the spoken words of the provided text string. It should be noted that this may also include the computation of the target prosody such as pitch contour, phoneme durations, etc., which may then be imposed onto the output speech. However, this may not be required.

In some exemplary embodiments hereof, the text-to-audio 130 may randomly assign different output voices or patterns to its audio output, thereby further anonymizing the output.

The electronic sound files comprising the spoken word of the provided text string may then be output to the audio output device 140 to be broadcast as audible sound waves. It can be seen that this results in the artificial reproduction of the original commands spoken by the user. That is, the original commands spoken by the user are output in audible form as a synthesized voice.

Text-to-audio converter 130 may also include pieces of recorded speech stored in databases (for example, within memory 406) that may be concatenated as required to reproduce the spoken words. In addition, converter 130 may store different sizes of stored speech units such as phones, diphones or entire words or sentences that may be concatenated to form the spoken audio file. Alternatively, text-to-audio converter 130 may incorporate a model of the human vocal tract and other human voice characteristics to create a synthetic voice output.

It may be preferable that the synthesized speech be of high quality, and that the voice is clear and articulate and at a tempo, volume and pitch that may be easily understood by the smart home system 160. As noted above, the output of the text-to-audio converter 130 may be optimized or tuned for the smart home system 160.

It should be noted that the above sequence of acts taken to convert the received text string to a spoken word audio output is meant for demonstration purposes and does not limit the current invention in any way. In addition, other techniques and other sequences of acts may also be used to convert the received text to a spoken word output. It should also be noted that text-to-audio software 402 and speech synthesis software 404 may be combined as one software platform or package, or as any other combination of different software platforms or packages.

At this point, the resultant electrical signal may be output at port 7 of the text-to-audio converter 130 and into port 8 (FIGS. 5A, 5B, 5C) of the audio output device 140. As stated above, audio output device 140 may comprise a speaker or other type of sound wave generator that may convert the electronic signal to an audible sound waveform. In this way, audio output device 140 may output the synthesized voice converted from text.

Figure 5A:
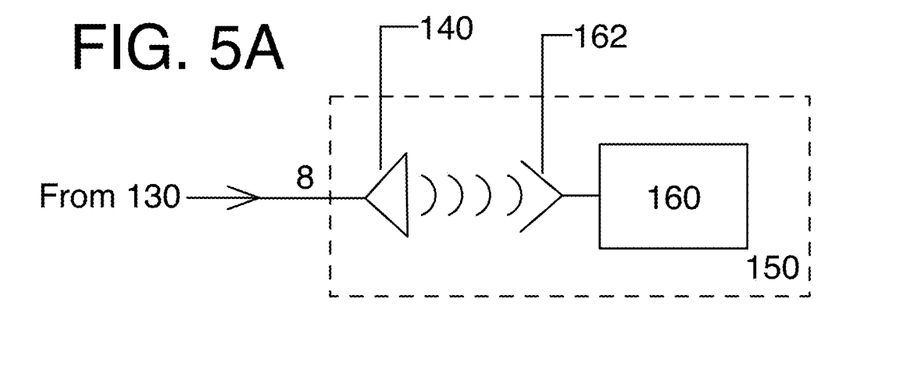
FIGS. 5A-5B are block diagrams of an audio output device configured with a voice activated system and a sound shield according to exemplary embodiments hereof.

As shown in FIG. 5A, speaker 140 and smart home system 160 may be generally contained within sound shield 150. Sound shield 150 may include one or more soundproof enclosures that may generally block sound waves from outside the sound shield 150 from penetrating to within the sound shield 150. In this way, spoken audio commands from the user may not penetrate sound shield 150 and may therefore not be received by audio input 162 of smart home system 160.

Alternatively, sound shield 150 may not entirely block outside sound waves from entering sound shield 150, but may dampen or attenuate the outside sound waves to a level that they may be generally inaudible or otherwise low enough that they may be imperceptible to audio input 162. In this way, the spoken commands from the user may be attenuated by sound shield 150 and not received by audio input 162.

However, with speaker 140 configured within sound shield 150, the synthesized voice output from speaker 140 may be received by audio input 162 and input into smart home system 160 for processing. In this way, only the synthesized voice output from speaker 140 may be received and processed by smart home system 160. It should be reiterated that with this configuration, the original spoken command by the user may not be received by the audio input 162 of the smart home system 160 and that only a synthesized reproduction of the voice command may be received, thus providing voice anonymity, privacy and security to the user.

Figure 5B:
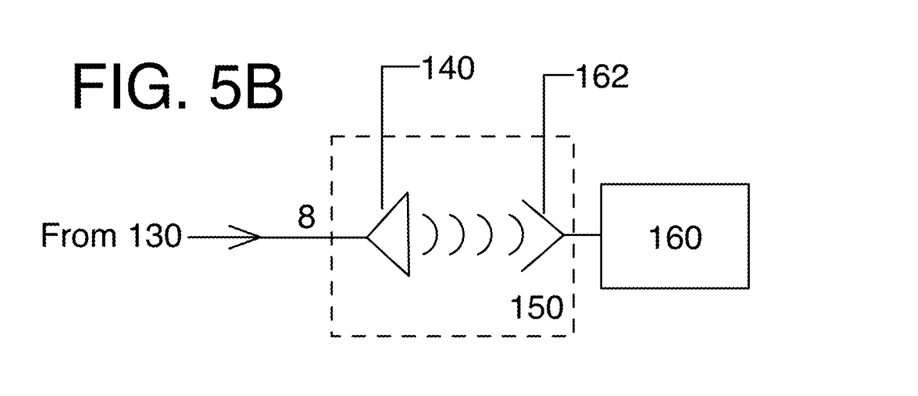

In another example as depicted in FIG. 5B, speaker 140 and audio input 162 may be generally enclosed within sound shield 150 with a portion of smart home system residing outside sound shield 150. It may be preferable in this example that any portion, component or element of smart home system 160 that may be capable of receiving audio signals be configured within sound shield 150 such that smart home system 160 may not receive any audio signals that may reside outside enclosure 150. For example, if the audio input 162 of smart home system 160 comprises a microphone that may be configured on the top surface of the smart home system 160, only the top surface area that includes the microphone may be required to be configured within the sound shield 150. In this example, the sound shield 150 may comprise a decorative dampening device that may be configured with the top of the smart home system 150 to cover the microphone and attenuate any sound waves that may be present outside the dampening device. In this way, only the necessary portion(s) of the smart home system 160 may be covered by the sound shield 150, leaving other elements such as buttons, indicators, or other types of controls or elements accessible to the user as required.

Figure 5C:
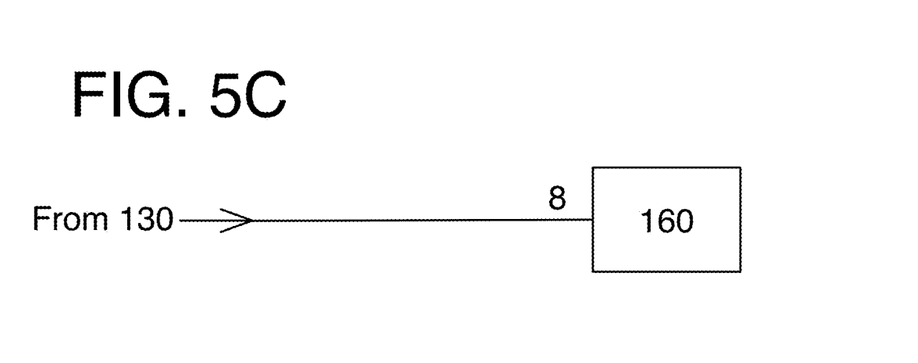
FIG. 5C is a block diagram of an input signal provided to a voice activated system according to exemplary embodiments hereof.

In addition, as depicted in FIG. 5C, audio output device 140 may be eliminated and the output of text-to-audio converter 130 may be input directly into the smart home system 160. In this scenario, it may be preferable that the output signal of text-to-audio converter 130 be injected into the smart home system 160 at a juncture in its electrical architecture that may be able to receive, interpret, and process it directly. For example, this may be at a juncture that may be configured after its input microphone 162, and microphone 162 may thereby be deactivated so that it may not receive input audio signals of any kind. It may also be preferable that the format of the injected signal be compatible with the components and/or systems within smart home system 160 that may receive the signal so that signal may be processed without errors. It can be seen that this configuration may also eliminate the need for sound shield 150 since no actual audio signals may be received by audio input 162.

It can be seen from the above description that system 100 may provide a system that may receive a voice command from a user of a smart home device 160, may prevent the voice command from being received directly by the audio input 162 of the smart home system 160, may convert the received voice command to text, may convert the resulting text to synthesized speech, and may output the synthesized speech as a sound wave into the audio input 162 of the smart home system 160 for processing. In this way, the smart home system 160 may not receive, process, store, upload to the Internet or other network, or otherwise have, possess, manipulate, or utilize any type of voice record from the user in any way. Instead, it may only capture an anonymized and synthesized version of the user's voice. Accordingly, system 100 may provide security and privacy to the user by keeping his/her unique voice biometric data and characteristics secure, protected, and private.

OPERATION OF THE SYSTEM

Figure 6:
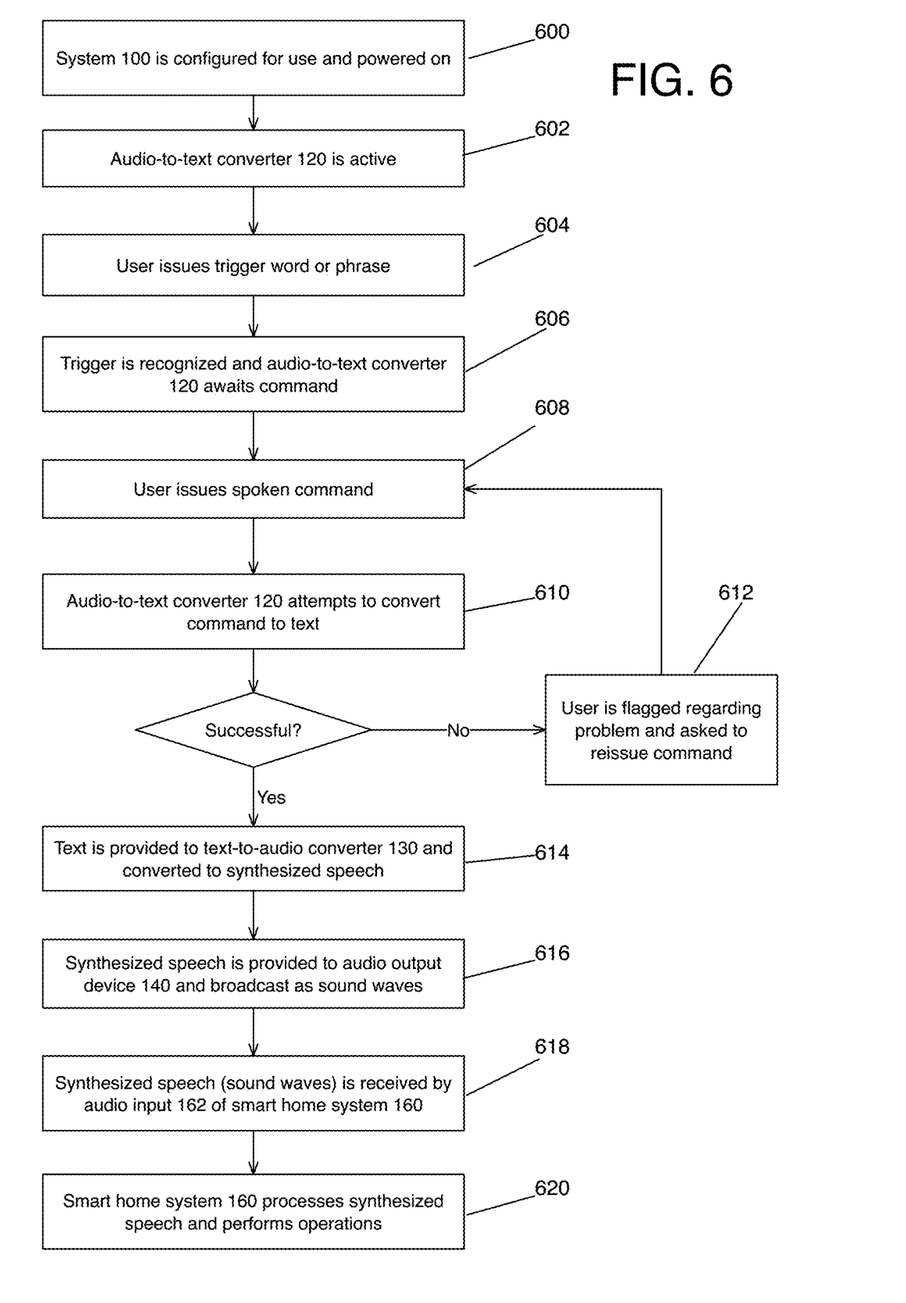
FIG. 6 is a flowchart of the process for use of a voice privacy system according to exemplary embodiments hereof.

With reference now to the flowchart in FIG. 6, the process for using system 100 will now be described in detail. The user may configure system 100 with a smart home system 160 or other system (e.g., voice-controlled system) that may benefit from its use (at 600). This may include configuring the smart home system 160, or at least its audio input 162, within the sound shield 150 so that the audio input 162 may be prevented from receiving audio signals from outside the shield 150. Audio output device 140 of system 100 may also be configured within sound shield 150 so that audio input 162 may receive audio signals from audio output device 140.

System 100 may also be powered "on" and initialized such that it may be operational. At this point (at 602), audio-to-text converter 120 and its voice recognition software 302 may become active and may await a trigger word, phrase, or control action to be received.

At 604, the user may then issue a trigger word or phrase that may be received by receiver system 110. The trigger word or phrase may then be relayed to the audio-to-text converter 120 and its voice recognition software 302 may recognize the trigger. Once the trigger is recognized, the audio-to-text converter 120 may expect a spoken command from the user (at 606). In the case of a trigger action used to trigger voice recognition software 302 (such as the pressing of a button), the trigger action may be implemented directly to audio-to-text converter 120 or to any other component or system of system 100.

At this point, the user may issue a spoken command that may be received by receiver system 110 and relayed to audio to converter 120 (at 608). The command may be a string of words followed by a pause, a moment of silence or a "stop" word or phrase that may signify that the end of the command has been reached.

At 610, the audio-to-text converter and its audio-to-text conversion software 304 may attempt to convert the received signal to a signal that includes a textual representation of the command words spoken by the user. If the conversion cannot be successfully completed (for example, if the spoken command by the user is not recognizable), the user may be notified that an error has occurred and that the user may try issuing the command again (at 612). The user may then reissue the spoken command at 608 and the process may loop until the command is successfully received and converted to text. Note that in this example, the user may not be required to reissue the trigger word or phrase, but in a different scenario this may be required (for example, if the user waits too long to reissue the command).

If the conversion is successful, the resulting signal may be provided to text-to-audio converter 130 and converted to a synthesized speech signal (at 614). Note that this resulting signal may include a synthesized version of each spoken word (the command) issued by the user in the order issued.

At 616, the synthesized voice signal may be provided to the audio output device 140 within sound shield 150 to be broadcast as audible sound waves.

At 618, the synthesized voice signal in the form of audible sound waves may be received by audio input 162 of the smart home system 160. In addition, at 620, the input signal may be processed and the smart home system 160 may attempt to perform the requested operation(s) according to the command.

It should be noted that according to an exemplary embodiment of the current invention, that the smart home system 160 at no time may receive an audio command directly from the user in the process described above.

In addition, the acts and the order of acts described are meant for demonstration purposes and do not limit the scope of the invention in any way. Other acts and/or orders of acts may also be used to accomplish a similar result according to the current invention.

In one example of system 100 in practice, a user may issue a command for the smart home system 160 to turn on their television set. In this example, the command may be received by system 100, converted to text, converted to synthesized audio, and provided to the smart home system 160 as described above. The smart home system 160 configured with the user's television set may then power on the TV.

Note that in all of the embodiments described above, that the interconnections between the various systems, components, or elements of system 100 may be hardwired, wireless, networked, through the Internet, or through any other type of transmission protocol or combination of transmission protocols.

In addition, all signals that may be received, relayed, shared, or otherwise transmitted between the various systems, components, or elements of system 100 may be analog, digital, a combination of analog or digital, or may be in other formats.

In addition, it should be noted that while system 100 has been described as generally comprising an audio receiver system 110, an audio-to-text converter 120, a text-to-audio converter 130, an audio output device 140 and a sound shield 150, these various systems and components may be combined or divided into one or more systems or components. The systems and components described are meant for demonstration purposes and system 100 may include different architectures of the various systems and components. For instance, audio-to-text converter 120 and text-to-audio converter 130 may reside on the same processor. In addition, various software programs or applications described above may also be combined into one or more software programs or applications. For example, audio-to-text converter software 302 and text-to-audio software 402 may be combined into a single software program or application. Other combinations of systems and software applications may also be implemented as desired.

In addition, system 100 may operate using different languages such as English, Spanish, Mandarin, French, Italian, German, Russian, and other languages as desired.

REAL TIME

Those of ordinary skill in the art will realize and understand, upon reading this description, that, as used herein, the term "real time" means near real time or sufficiently real time. It should be appreciated that there are inherent delays in communication/control systems (e.g., based on distances), and these delays may cause delays in data reaching various system components. Inherent delays in the system do not change the real time nature of the data. In some cases, the term "real time data" may refer to data obtained in sufficient time to make the data useful for its intended purpose (e.g., control). Although the term "real time" has been used here, it should be appreciated that the system is not limited by this term or by how much time is actually taken for data to have an effect on control information.

Thus is provided a system and method for anonymizing a user's voice for a voice-activated/controlled device. As should be appreciated, upon reading this description, since the voice-activated/controlled device does not hear audio from the user, the device does not and cannot determine a signature or other biometric data about the user's voice. Since the device only receives a synthesized voice, it has no way of associating that voice with any particular user.

As used herein, including in the claims, the phrase "at least some" means "one or more," and includes the case of only one. Thus, e.g., the phrase "at least some ABCs" means "one or more ABCs," and includes the case of only one ABC.

As used in this description, the term "portion" means some or all. So, for example, "A portion of X" may include some of "X" or all of "X". In the context of a conversation, the term "portion" means some or all of the conversation.

As used herein, including in the claims, the phrase "based on" means "based in part on" or "based, at least in part, on," and is not exclusive. Thus, e.g., the phrase "based on factor X" means "based in part on factor X" or "based, at least in part, on factor X." Unless specifically stated by use of the word "only", the phrase "based on X" does not mean "based only on X."

As used herein, including in the claims, the phrase "using" means "using at least," and is not exclusive. Thus, e.g., the phrase "using X" means "using at least X." Unless specifically stated by use of the word "only", the phrase "using X" does not mean "using only X."

In general, as used herein, including in the claims, unless the word "only" is specifically used in a phrase, it should not be read into that phrase.

As used herein, including in the claims, the phrase "distinct" means "at least partially distinct." Unless specifically stated, distinct does not mean fully distinct. Thus, e.g., the phrase, "X is distinct from Y" means that "X is at least partially distinct from Y," and does not mean that "X is fully distinct from Y." Thus, as used herein, including in the claims, the phrase "X is distinct from Y" means that X differs from Y in at least some way.

It should be appreciated that the words "first" and "second" in the description and claims are used to distinguish or identify, and not to show a serial or numerical limitation. Similarly, the use of letter or numerical labels (such as "(a)", "(b)", and the like) are used to help distinguish and/or identify, and not to show any serial or numerical limitation or ordering.

No ordering is implied by any of the labeled boxes in any of the flow diagrams unless specifically shown and stated. When disconnected boxes are shown in a diagram, the activities associated with those boxes may be performed in any order, including fully or partially in parallel.

While the invention has been described in connection with what is presently considered to be the most practical and preferred embodiments, it is to be understood that the invention is not to be limited to the disclosed embodiment, but on the contrary, is intended to cover various modifications and equivalent arrangements included within the spirit and scope of the appended claims.

We claim:

1. A system for anonymizing a user's voice for a voice-activated/controlled device, the system comprising:
   an audio receiver; a speech-to-text converter; a text-to-speech converter; and an audio output device, wherein
   the speech-to-text converter is operatively connected to the audio receiver configured to receive an audio phrase in the user's voice from the audio receiver and to provide, as a textual output, a speech-to-text conversion of the audio phrase to the text-to-speech converter, wherein the audio phrase in the user's voice comprise one or more words, and wherein the speech-to-text converter converts the one or more words in the audio phrase in the user's voice to a textual representation of said one or more words, and wherein the speech-to-text conversion provided to the text-to-speech converter comprises said textual representation of said one or more words in the audio phrase in the user's voice, and wherein
   the text-to-speech converter is operatively connected to the speech-to-text converter to receive as input the textual output from the speech-to-text converter and to provide an audio output corresponding to said textual output from the speech-to-text converter to the audio output device, and wherein
   the audio output device is operatively connected to the text-to-speech converter and configured within at least one sound shield to receive said audio output from the text-to-speech converter and to provide said audio output from said text-to-speech converter as audio input to at least one audio input device of the voice-activated/controlled device, and
   wherein the audio output comprises a synthesized voice phrase corresponding in content to the audio phrase received by the audio receiver, and
   wherein the at least one sound shield is configured: (i) to allow the synthesized voice phrase from the audio output device to be received by the at least one audio input device of the voice-activated/controlled device, and (ii) to substantially block direct human voice audio input to the voice-activated/controlled device from a user.

2. The system of claim 1 wherein the audio phrase comprises a voice command for the voice-activated/controlled device.

3. The system of claim 1, wherein a portion of the voice-activated/controlled device is contained within the at least one sound shield.

4. The system of claim 3, wherein the voice-activated/controlled device is fully contained within the at least one sound shield.

5. The system of claim 1, wherein the at least one sound shield is constructed, adapted, and configured to prevent substantially all sounds, except synthesized voice sound from the audio output device, from reaching the voice-activated/controlled device.

6. The system of claim 5, wherein the at least one sound shield is constructed, adapted, and configured to prevent substantially all sounds, except synthesized voice from the audio output device, from reaching the at least one audio input device of the voice-activated/controlled device.

7. The system of claim 1, wherein the voice-activated/controlled device is a network-connected device.

8. The system of claim 7, wherein the network is the Internet.

9. The system claim 1, wherein at least the speech-to-text converter and the text-to-speech converter operate in real time in response to receipt of the audio phrase in the user's voice by the speech-to-text converter from the audio receiver.

10. A method for anonymizing a spoken human voice, the method comprising:
    (A) obtaining, via an audio receiver, a spoken human voice phrase from a user, the spoken human voice phrase comprising one or more words in the user's voice; and then,
    (B) with a speech-to-text converter operatively connected to the audio receiver, converting said one or more words in the spoken voice phrase received from the audio receiver to text comprising a textual representation of said one or more words; and then
    (C) the speech-to-text converter providing the text to a text-to-speech converter operatively connected to the speech-to-text converter; and then
    (D) the text-to-speech converter converting the text received from the speech-to-text converter to an audio signal; and then
    (E) the text-to-speech converter providing the audio signal to an audio output device operatively connected to the text-to-speech converter; and then
    (F) outputting audio output corresponding to the audio signal using the audio output device, wherein the audio output device is within at least one sound shield, and
    wherein the audio output in (F) comprises a synthesized voice phrase corresponding in content to the spoken voice phrase in the user's voice obtained from the user in (A), and wherein the synthesized voice phrase is distinct in sound from the spoken voice phrase, and
    wherein the at least one sound shield is configured: (i) to allow audio input from the audio output device to be received by a voice-activated/controlled device, and (ii) to otherwise substantially block spoken human voice input to the voice-activated/controlled device.

11. The method of claim 10, wherein a portion of the voice-activated/controlled device is contained within the sound shield.

12. The method of claim 10, wherein the voice-activated/controlled device is fully contained within the sound shield.

13. The method of claim 10, wherein the audio output device is at least partially contained within the sound shield.

14. The method of claim 10, wherein the at least one sound shield is constructed, adapted, and configured to prevent substantially all sounds, except sound from the audio output device, from reaching the voice-activated/controlled device.

15. The method of claim 14, wherein the voice-activated/controlled device has at least one audio input device, and wherein the at least one sound shield is constructed, adapted, and configured to prevent substantially all sounds, except synthesized voice sound from the audio output device, from reaching the at least one audio input device of the voice-activated/controlled device.

16. The method of claim 10, wherein the voice-activated/controlled device is a network-connected device.

17. The method of claim 16, wherein the network is the Internet.

18. The method claim 10, wherein at least the converting in (B) and the converting in (D) occur in real time in response to receipt of the spoken human voice phrase by the speech-to-text converter from the audio receiver.

19. The method of claim 10, wherein the audio receiver is hardwired to the speech-to-text converter.

20. The system of claim 1, wherein the audio receiver is hardwired to the speech-to-text converter.

21. A system comprising:
    an audio receiver; a speech-to-text converter; a text-to-speech converter; and an output device, wherein
    the speech-to-text converter is operatively connected to and hardwired to the audio receiver to receive an audio phrase in the user's voice from the audio receiver and to provide, as a textual output, a speech-to-text conversion of the audio phrase to the text-to-speech converter, wherein the audio phrase in the user's voice comprise one or more words, and wherein the speech-to-text converter converts the one or more words in the audio phrase in the user's voice to a textual representation of said one or more words, and wherein the speech-to-text conversion provided to the text-to-speech converter comprises said textual representation of said one or more words in the audio phrase in the user's voice, and wherein
    the text-to-speech converter is operatively connected to the speech-to-text converter to receive as input the textual output from the speech-to-text converter and to provide an audio output corresponding to said textual output from the speech-to-text converter to an output device, and wherein
    the output device is operatively connected to the text-to-speech converter to receive said audio output from the text-to-speech converter, and wherein the output device is connected to a voice-activated/controlled device to provide said audio output from said text-to-speech converter as input to the voice-activated/controlled device, and
    wherein the audio output comprises a synthesized voice phrase corresponding in content to the audio phrase received by the audio receiver, and
    wherein the at least one sound shield is configured to substantially block direct human voice audio input to the voice-activated/controlled device from a user.

* * * * *